(12) United States Patent
Marty et al.

(10) Patent No.: US 10,876,783 B2
(45) Date of Patent: *Dec. 29, 2020

(54) CONDENSED WATER COLLECTOR

(71) Applicant: Roche Diagnostics Operations, Inc., Indianapolis, IN (US)

(72) Inventors: Christian Marty, Goldau (CH); Beat Widmer, Steinhausen (CH); Markus Jeziorski, Meierskappel (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 73 days.

This patent is subject to a terminal disclaimer.

(21) Appl. No.: 16/183,212

(22) Filed: Nov. 7, 2018

(65) Prior Publication Data
US 2019/0078830 A1   Mar. 14, 2019

Related U.S. Application Data

(63) Continuation of application No. 15/261,166, filed on Sep. 9, 2016, now Pat. No. 10,156,397.

(30) Foreign Application Priority Data

Sep. 24, 2015   (EP) ..................... 15186705

(51) Int. Cl.
*F25D 21/14* (2006.01)
*B01L 1/00* (2006.01)
(Continued)

(52) U.S. Cl.
CPC ............... *F25D 21/14* (2013.01); *B01D 1/14* (2013.01); *B01D 5/006* (2013.01); *B01D 5/0042* (2013.01);
(Continued)

(58) Field of Classification Search
CPC .... F25D 2321/147; F25D 21/14; F25D 11/00; F24F 3/14; F24F 3/147; F24F 2013/225;
(Continued)

(56) References Cited

U.S. PATENT DOCUMENTS 2,801,707 A  *  8/1957  Asker .................... B01D 53/26
                                                        95/106
3,289,752 A      12/1966  Staub
(Continued)

FOREIGN PATENT DOCUMENTS

JP    H10-192719 A      7/1998
JP    2009-270857 A    11/2009
(Continued)

*Primary Examiner* — Christopher R Zerphey
(74) *Attorney, Agent, or Firm* — Roche Diagnostics Operations, Inc.

(57) ABSTRACT

A compartment comprising at least one target area susceptible to condensed water formation includes at least one condensed water collector is presented. The condensed water collector comprises at least a first portion arranged to collect condensed water from the at least one target area and at least a second portion outside of the at least one target area. A porous material is arranged between the first portion and the second portion. The condensed water collector is configured to transport the collected condensed water. The compartment further including a condensed water remover configured to remove condensed water from the second portion thereby facilitating transportation of condensed water from the first portion to the second portion via the porous material.

10 Claims, 6 Drawing Sheets

(51) Int. Cl.
*B01D 1/14* (2006.01)
*B01D 5/00* (2006.01)

(52) U.S. Cl.
CPC ........... *B01L 1/00* (2013.01); *B01L 2200/141* (2013.01); *B01L 2200/142* (2013.01); *B01L 2300/069* (2013.01); *B01L 2300/161* (2013.01); *B01L 2300/1822* (2013.01); *B01L 2300/1894* (2013.01); *B01L 2400/0406* (2013.01); *B01L 2400/0457* (2013.01); *F25D 2321/147* (2013.01)

(58) Field of Classification Search
CPC ....... B01L 2300/069; B01L 2300/1822; B01L 2400/0406; G01N 1/42
See application file for complete search history.

(56) References Cited

U.S. PATENT DOCUMENTS

| | | | | |
|---|---|---|---|---|
| 4,364,234 A | * | 12/1982 | Reed | ........................ F25B 21/02 165/265 |
| 6,158,224 A | * | 12/2000 | Hu | ............................ F24F 3/14 62/3.4 |
| 6,170,267 B1 | * | 1/2001 | Kitaoka | .................... B01L 7/00 62/3.6 |
| 7,937,953 B2 | * | 5/2011 | Tsai | ........................ F24F 3/147 62/3.3 |
| 10,156,397 B2 | * | 12/2018 | Marty | ....................... B01L 1/00 |
| 2006/0032242 A1 | | 2/2006 | TeGrotenhuis et al. | |
| 2006/0118274 A1 | * | 6/2006 | Lee | ......................... F24F 13/30 165/58 |
| 2013/0137105 A1 | | 5/2013 | Zhang | |
| 2013/0240181 A1 | | 9/2013 | Yasunaga | |
| 2014/0099631 A1 | | 4/2014 | Testa et al. | |
| 2017/0010006 A1 | * | 1/2017 | Kim | ........................ F24F 3/147 |

FOREIGN PATENT DOCUMENTS

| | | | |
|---|---|---|---|
| JP | 2010-276555 A | 12/2010 | |
| JP | 2010276555 A | * 12/2010 | ............. G01N 35/00 |
| JP | 2012-194071 A | 10/2012 | |
| JP | 2014-119328 A | 6/2014 | |
| JP | 2015-064220 A | 4/2015 | |
| WO | 2009/055946 A1 | 5/2009 | |

* cited by examiner

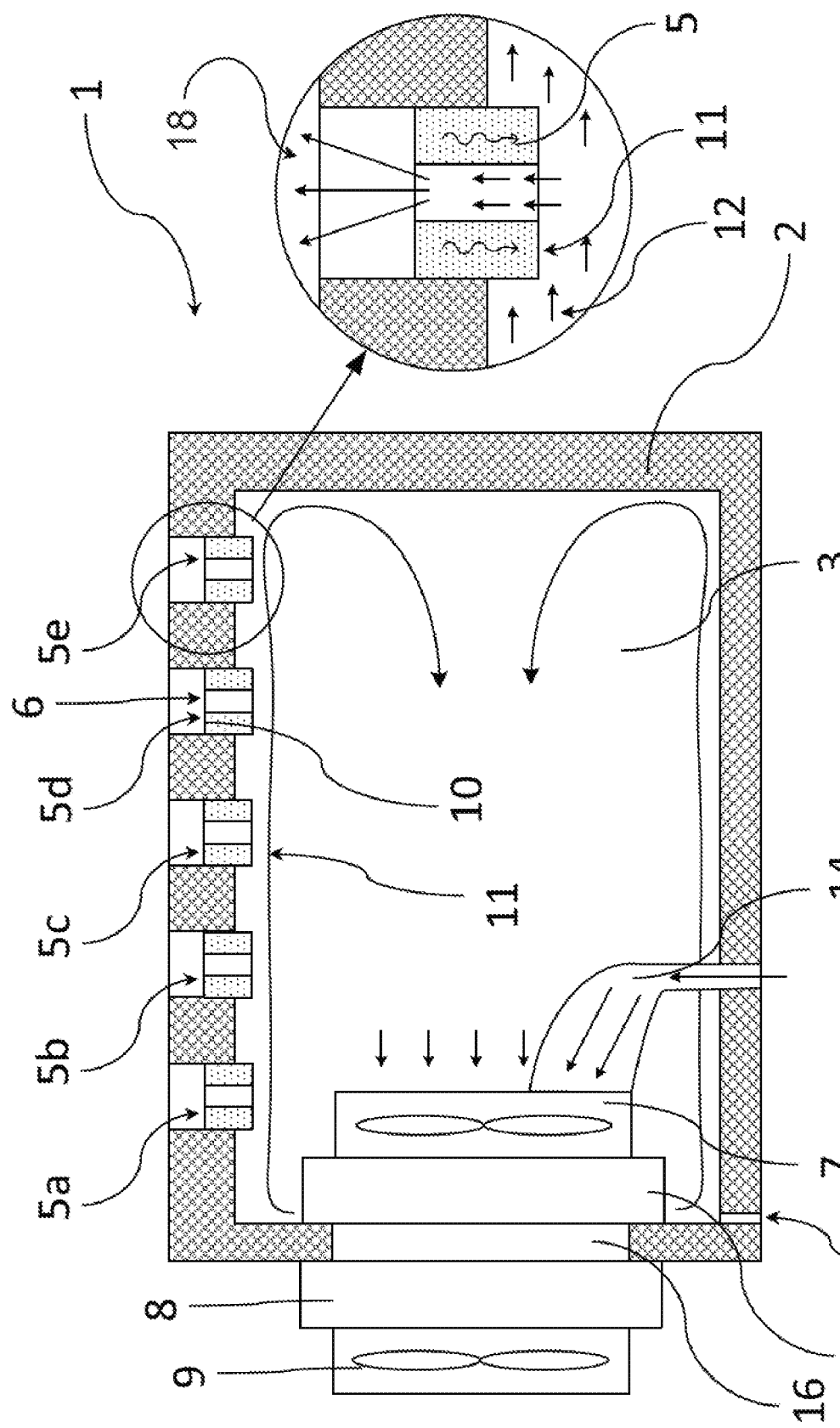
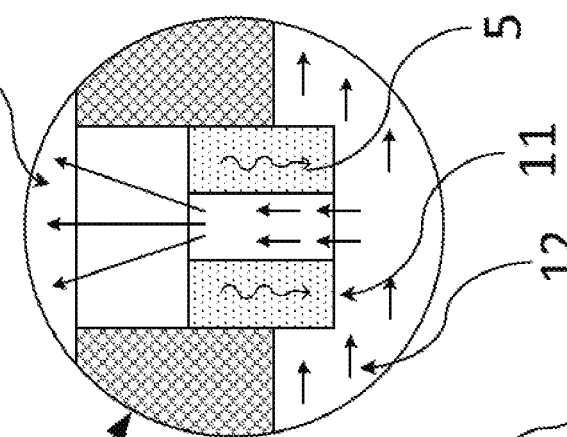
FIG. 2A
FIG. 2B

CONDENSED WATER COLLECTOR

CROSS-REFERENCE TO RELATED APPLICATIONS

This application is a continuation of patent application Ser. No. 15/261,166, filed on Sep. 9, 2016, now allowed, which claims priority to EP 15186705.8, filed Sep. 24, 2015, which are hereby incorporated by reference.

BACKGROUND

The present disclosure relates to compartments including condensed water collectors.

In some known compartments of analysis systems, e.g., reagent container compartments or sample container compartments, the formation of condensed water can be an issue. For example, it can be necessary to access the interior of the compartment in order to access the containers therein, e.g., to sample material from the containers. On the other hand, an interior space of the compartment can be cooled. In this situation, condensed water can condense. For instance, condensed water can form near or at openings through which the containers inside the compartment are accessed. The formation of condensed water can have various disadvantageous effects. For instance, condensed water can drip into or onto the containers located inside the compartment or onto other sensitive components of the compartment and thereby interfere with the sampling process or damage components of the compartment. Condensed water formation can also be an issue in compartments in many other technical systems.

Therefore, there is a need for a condensed water collector to guide condensed water away from target area to a place where it can be safely disposed that is simple and cost-effective.

SUMMARY

According to the present disclosure, a compartment comprising at least one target area susceptible to condensed water formation is presented. The compartment can comprise at least one condensed water collector. The condensed water collector can comprise at least a first portion arranged to collect condensed water from the at least one target area and at least a second portion outside of the at least one target area. The condensed water collector can comprise a porous material arranged between the first portion and the second portion and configured to transport the collected condensed water. The compartment can also comprise a condensed water remover configured to remove condensed water from the second portion thereby facilitating transportation of condensed water from the first portion to the second portion via the porous material.

Accordingly, it is a feature of the embodiments of the present disclosure to provide a condensed water collector to guide condensed water away from target area to a place where it can be safely disposed that is simple and cost-effective. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 2a illustrates another example compartment including a condensed water remover and a condensed water collector according to an embodiment of the present disclosure.

FIG. 2b illustrates a detail of FIG. 2a including a condensed water collector according to an embodiment of the present disclosure.

DETAILED DESCRIPTION

Figures 1A, 1B:
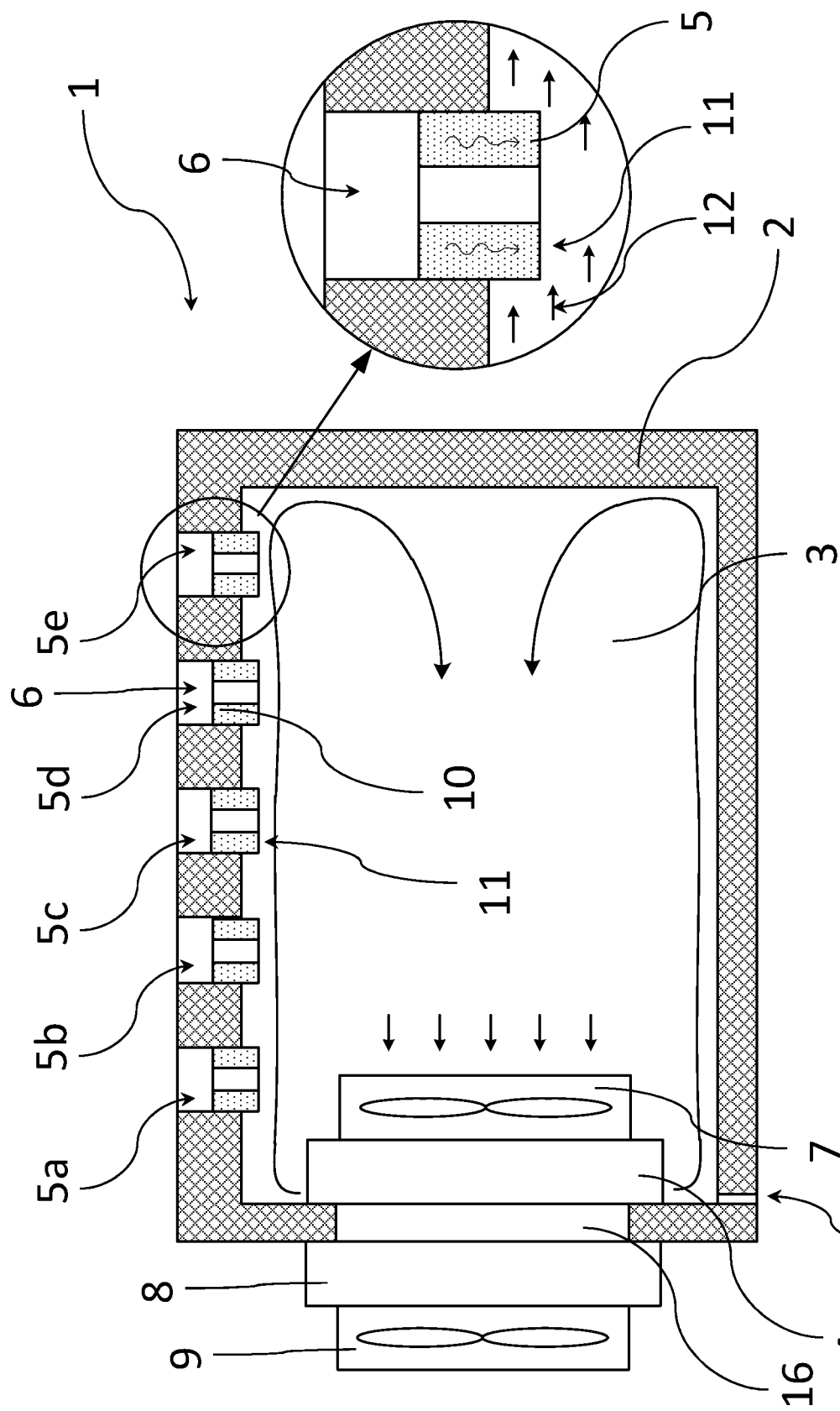
FIG. 1a illustrates an example compartment including a condensed water remover and a condensed water collector according to an embodiment of the present disclosure.
FIG. 1b illustrates a detail of FIG. 1a including a condensed water collector according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A compartment comprising at least one target area susceptible to condensed water formation can comprise at least one condensed water collector. The condensed water collector can comprise at least a first portion arranged to collect condensed water from the at least one target area and at least a second portion outside of the at least one target area and can further comprise a porous material arranged between the first portion and the second portion and configured to transport the collected condensed water. The compartment can further comprise a condensed water remover configured to remove condensed water from the second portion thereby facilitating transportation of condensed water from the first portion to the second portion via the porous material.

The compartment can have one or more of the following advantages.

Firstly, the condensed water collector can reduce a probability that condensed water drips or runs into places where it can damage the compartment or material stored in the compartment (e.g., samples or reagents). In particular, in some examples of compartments condensed water sources can be located directly over containers stored in the compartment (e.g., condensed water sources can be located in openings to insert pipetting devices into the compartment where warm and wet air comes into contact with cooled surfaces of the compartment). In these examples, the condensed water collector can guide the condensed water away from target area to a place where it can be safely disposed of (e.g., by draining or evaporation).

Secondly, the condensed water collector can be configured and shaped to carry the condensed water to any place inside or outside the compartment. The porous material of the condensed water collector can operate similar to a wick and transport the condensed water. In some examples, the condensed water can even be moved upwards against the force of gravity and/or over comparatively large distances (e.g., across the entire height or width of a compartment). In this manner, the condensed water collector can be flexibly adapted to a large number of compartment sizes and geometries.

Thirdly, the condensed water collector can operate without moving parts. This can make the condensed water collector less complex and error-prone. In particular, in some examples, the condensed water collector can transport condensed water out of the compartment in a passive manner (e.g., by capillary forces acting in the porous material and/or gravitational forces) thereby superseding any additional condensed water management inside the compartment.

Fourthly, the condensed water collector can in some examples cooperate with already existing components of a cooling system of a compartment as condensed water remover. For instance, a fan of a cooling system of the compartment can be employed to dry a region of the condensed water collector. In addition, or alternatively, a heat exchange of a cooling system of the compartment can be used as condenser to remove vaporized condensed water from air circulating in the compartment. In this manner, no, or only a few additional parts, can be required when implementing the condensed water remover which can make the solution less complex and more cost efficient in some examples.

The condensed water collectors can reduce a probability of the formation of condensed water drops or completely prevent the formation of drops of condensed water. However, this does not mean that the condensed water collectors have this effect under all possible operating conditions. It is clear that the formation of condensed water depends on the temperature and air moisture inside and outside of a compartment. Thus, even if a particular condensed water collector avoids the formation of condensed water drops under certain operation conditions, it might not do so under other operation conditions, e.g., if a level of moisture or a temperature gradient between a compartment's interior and the outside environment exceed a predetermined limit. However, this does not mean that such condensed water collector is not a condensed water collector as described.

Moreover, it might be the case that the condensed water collectors cannot collect condensed water or reduce or prevent the formation of condensed water drops when an amount of condensed water removed by the condensed water remover is insufficient. Again, this does not mean that such condensed water collector is not a condensed water collector.

The compartments can be part of an analysis system. An analyzer or an analytical work cell of an analysis system can be included partly or completely in a compartment. In addition, a compartment can include multiple analyzers or analytical work cells.

An 'analysis system' as used herein can comprise a control unit operatively coupled to one or more analytical, pre- and post-analytical work cells. The control unit can be operable to control the work cells. In addition, the control unit may be operable to evaluate and/or process gathered analysis data, to control the loading, storing and/or unloading of samples to and/or from any one of the analyzers, to initialize an analysis or hardware or software operations of the analysis system used for preparing the samples, sample tubes or reagents for said analysis and the like.

The term 'analyzer'/'analytical work cell' as used herein can encompass any apparatus or apparatus component that can induce a reaction of a biological sample with a reagent for obtaining a measurement value.

An analyzer can be operable to determine via various chemical, biological, physical, optical or other technical procedures a parameter value of the sample or a component thereof. An analyzer may be operable to measure the parameter of the sample or of at least one analyte and return the obtained measurement value. The list of possible analysis results returned by the analyzer can comprise, without limitation, concentrations of the analyte in the sample, a qualitative result indicating the existence of the analyte in the sample (corresponding to a concentration above the detection level), optical parameters, nucleic acid sequences, data obtained from mass spectroscopy of proteins or metabolites and physical or chemical parameters of various types. An analytical work cell may comprise units for the pipetting, dosing, and mixing of samples and/or reagents. The analyzer may comprise a reagent holding unit for holding reagents to perform the assays. Reagents may be arranged for example in the form of containers or cassettes containing individual reagents or group of reagents, placed in appropriate receptacles or positions within a storage compartment or conveyor. The analyzer may comprise a consumable feeding unit. The analyzer may comprise a process and detection system whose workflow is optimized for certain types of analysis. Examples of such analyzer can be clinical chemistry analyzers, coagulation chemistry analyzers, immunochemistry analyzers, urine analyzers, nucleic acid analyzers, used to detect the result of chemical or biological reactions or to monitor the progress of chemical or biological reactions.

The terms 'sample' can refer to material(s) that may potentially contain an analyte of interest. The patient sample can be derived from any biological source, such as a physiological fluid, including blood, saliva, ocular lens fluid, cerebrospinal fluid, sweat, urine, stool, semen, milk, ascites fluid, mucous, synovial fluid, peritoneal fluid, amniotic fluid, tissue, cultured cells, or the like. The patient sample can be pretreated prior to use, such as preparing plasma from blood, diluting viscous fluids, lysis or the like. Methods of treatment can involve filtration, distillation, concentration, inactivation of interfering components, and the addition of reagents. A patient sample may be used directly as obtained from the source or used following a pretreatment to modify the character of the sample. In some embodiments, an initially solid or semi-solid biological material can be rendered liquid by dissolving or suspending it with a suitable liquid medium. In some embodiments, the sample can be suspected to contain a certain antigen or nucleic acid. Samples and/or reagents can be stored in compartments in an analysis system.

Referring initially to FIGS. 1a-b, different embodiments of a compartment will be discussed. Subsequently, alternative or additional embodiments of compartments will be detailed in connection with FIG. 2a to FIG. 6.

FIG. 1a shows a compartment 1 comprising at least one target area 6 susceptible to condensed water formation. The compartment can comprise at least one condensed water collector 5a-5e. The condensed water collector 5a-5e can comprise at least a first portion 10 arranged to collect condensed water from the at least one target area and at least a second portion 11 outside of the at least one target area and can comprise a porous material arranged between the first portion 10 and the second portion 11 and configured to transport the collected condensed water. The compartment can further comprise a condensed water remover 4, 7 configured to remove condensed water from the second portion 11 thereby facilitating transportation of condensed water from the first portion 10 to the second portion 11 via the porous material.

The compartment 1 of FIG. 1*a* can comprise a plurality of condensed water collectors 5*a*-5*e*. The operation of the condensed water collectors 5*a*-5*e* and the condensed water remover 4, 7 in FIG. 1*a* will subsequently be discussed in more detail.

As can be seen in FIG. 1*a*, the compartment 1 can comprise a thermal insulation 2 with a plurality of openings 6 arranged therein. In one example, the plurality of openings 6 can be configured to insert a tool (e.g., a pipette or a needle) into the compartment 1. As the interior 3 of the compartment 1 can be cooled, condensed water can form in an area of the openings 6. Without the condensed water collectors 5*a*-5*e*, drops of condensed water might form at the openings 6 and might drip into the compartment 1.

However, in the compartment 1 of FIG. 1*a*, the condensed water collectors 5*a*-5*e* can be configured to collect the condensed water at the openings 6 (i.e., the target area). For example, the target area can be located near an upper end of the condensed water collectors 5*a*-5*e* (i.e., an end of the condensed water collectors 5*a*-5*e* facing in an outwards direction of the compartment 1). This can avoid or reduce the formation of drops of condensed water at or near the openings 6 of the compartment 1.

In one example, the compartment 1 can comprise an analytical work cell of an analysis system for biological samples, or a portion of an analytical work cell of an analysis system for biological samples. In other examples, the compartment can be configured to store biological samples, reagents to be used in an analysis process of a biological sample, or both. For instance, the compartment can be one or more of a sample storage compartment, a reagent storage compartment, a reagent manipulator compartment, a sample manipulator compartment and a quality control compartment.

However, in other examples the compartments of the present disclosure can also be used in analysis systems of other samples than biological samples or in systems that have other functions that analysis of samples. For instance, the compartments can be employed in systems where material can be stored or transported under cooled conditions. In general, the compartments can be used in all systems including compartments susceptible to condensed water formation.

The condensed water collectors 5*a*-5*e* of FIG. 1*a* can have the form of a plug, or insert, and include a hydrophilic porous material. The collected condensed water can spread in the collectors 5*a*-5*e* to different outer surfaces of the condensed water collectors 5*a*-5*e* which can form the second region of the condensed water collectors 5*a*-5*e* (i.e., the region of the condensed water collectors 5*a*-5*e* outside the target region where condensed water is collected).

Figure 4:
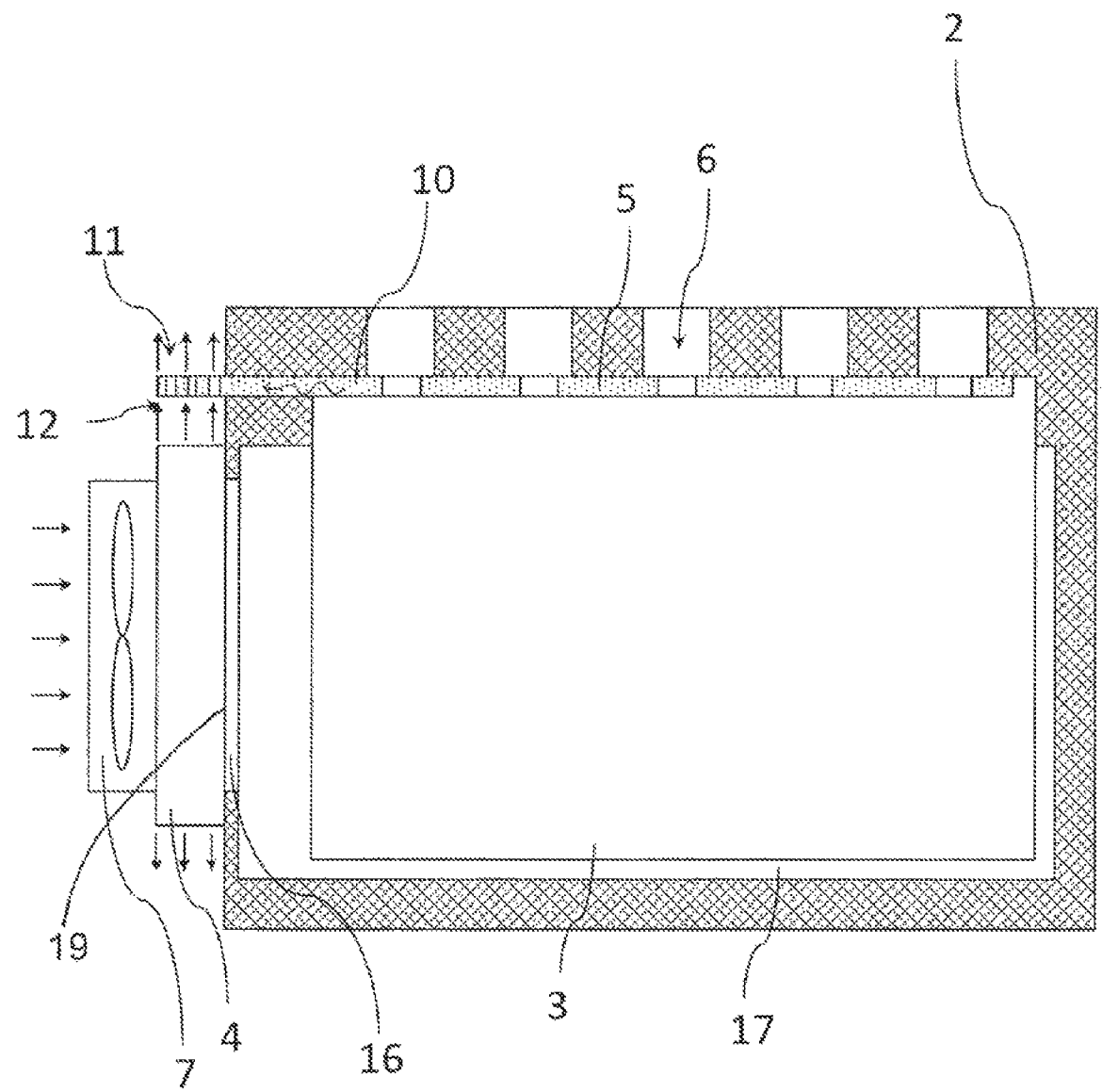
FIG. 4 illustrates a third example compartment including a condensed water remover and a condensed water collector according to an embodiment of the present disclosure.
Figure 5:
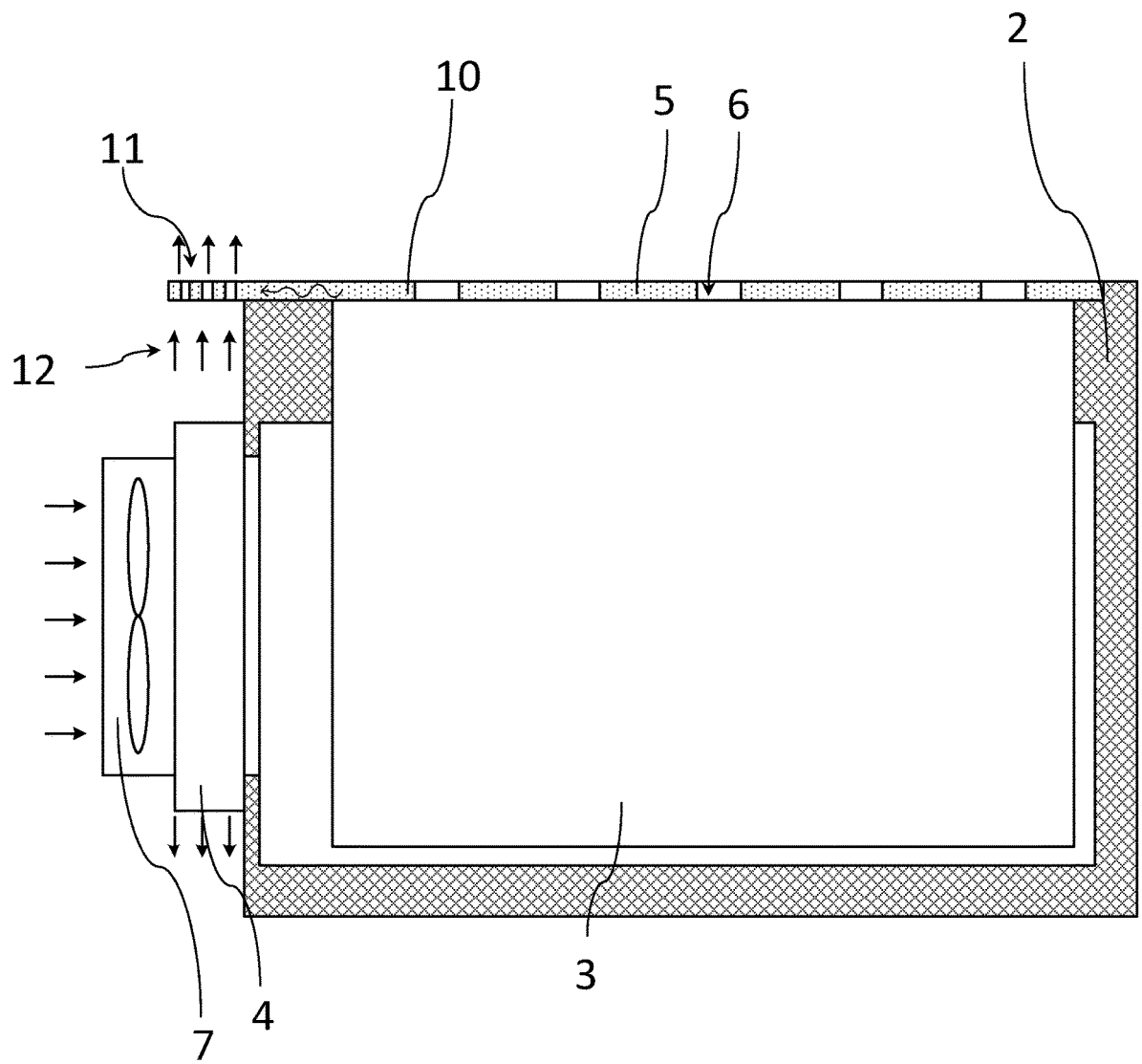
FIG. 5 illustrates a fourth example compartment including a condensed water remover and a condensed water collector according to an embodiment of the present disclosure.

In other examples, the condensed water collector can include a contingent element arranged adjacent to two or more of the openings (e.g., all openings such as the condensed water collectors of the compartments of FIGS. 4 and 5).

In addition to the condensed water collectors 5*a*-5*e*, the compartment 1 of FIG. 1*a* can comprise a condensed water remover including a fan 7. The fan 7 can be configured to generate a stream of air 12 passing over the outer surfaces (i.e., the second regions) of the condensed water collectors 5*a*-5*e*. The stream of air 12 can vaporize the condensed water stored in the condensed water collectors 5*a*-5*e* and can, thereby; remove condensed water from the condensed water collectors 5*a*-5*e* (as illustrated in FIG. 1*b*). This removal process can allow the condensed water collectors 5*a*-5*e* to collect new condensed water condensing at the openings 6 (i.e., the target area) and to transport the condensed water to the outer surfaces of the condensed water collectors 5*a*-5*e* where the new collected condensed water can be vaporized.

In other examples, the compartment 1 can comprise an air mover other than a fan (this is also the case for the other example compartments discussed). In general, the compartments can comprise any device for creating a stream of air over the second region of the condensed water collector. In addition, a stream of any other gas other than air can be used to remove condensed from the condensed water collectors of the present disclosure.

Returning to the compartment of FIG. 1*a*, the vaporized condensed water can be transported by the stream of air generated by the fan 7 towards a condenser 4 arranged inside the compartment 1 where it can condense. In the example of FIG. 1*a*, the condenser 4 can comprise a heat exchanger 4 of a cooling system for the compartment 1. For example, the cooling system can comprise a Peltier element 16 coupled to the heat exchanger 4. A cool(er) side of the Peltier element 16 can be arranged adjacent to the heat exchanger 4 to cool the heat exchanger 4 which in turn can cool air travelling through the heat exchanger 4. In this manner, one or more surfaces of the heat exchanger 4 can sufficiently be cooled so that the vaporized water in the stream of air can condense at the one or more surfaces. This process can extract at least a portion of the vaporized water from the stream of air. In one example, a temperature of the one or more surfaces of the heat exchanger can be under about 10° Celsius (e.g., under about 5° Celsius). This can result in a temperature of below about 15° Celsius (below about 10° Celsius) inside the compartment in some examples.

The cooling system of the compartment can further comprise heat exchanger 8 and fan 9 arranged outside of the compartment 1 which can be configured to transport heat away from a warm(er) surface of the Peltier element 16. However, these components can purely be optional in the compartment of FIG. 1*a*. Other examples of the compartment 1 may not have an outside heat exchanger 8 or an outside fan 9.

Moreover, the condensed water remover can also cooperate with other cooling devices than Peltier elements 16. In general, any cooling device can which provide cooling power to the compartment 1 can be used to cool one or more surfaces of the condenser of the condensed water remover so that vaporized water can condense at the cooled one or more surfaces.

The compartment 1 can optionally comprises a drainage 15 configured to drain the condensed water from the interior 3 of the compartment 1. For instance, the condensed water can drip from the cooled one or more surfaces of the heat exchanger 4 and collect in a lower portion of the compartment where the drainage 15 can be located.

In the above manner, a probability for the formation of condensed water drops at the target area(s) can be reduced compared to compartments without condensed water collectors 5*a*-5*e*. In some situations, the formation of condensed water drops can be avoided. The condensed water collectors can comprise a first region near a target area to collect condensed water and a second portion from which the condensed water can be removed. However, this may not mean that the condensed water can only be transported towards the second region and only removed from the second region. Rather, condensed water may spread in the complete condensed water collector. In addition, and alternatively, condensed water may also be removed from the first region adjacent to the target area (e.g., by a stream of air).

The particular embodiment of the condensed water collectors 5a-5e and the particular configuration and arrangement of the fan 7 and the heat exchanger 16 can be modified in other examples. For instance, a shape of the condensed water collectors 5a-5e can be different from the plug-shape shown in FIG. 1a. It can be understood that, e.g., in examples where no tool has to be inserted through the condensed water collectors, the condensed water collectors may not require a central opening. In addition, any surface cool enough to extract vaporized water from the stream of air inside the compartment 1 can be used as condenser in other examples (e.g., a particularly cool portion of the compartment's interior).

The compartment of FIGS. 2a-b is a variation of the compartment of FIG. 1a. The compartment 1 of FIG. 2a can comprise an optional funnel 14 to suck in air from an exterior of the compartment 1. The air sucked-in through the funnel 14 can be cooled (and optionally dried) at the heat exchanger 4 and circulated through the interior by the fan 7. As discussed above, the circulating stream of air can remove condensed water from the condensed water collectors 5a-5e.

In the compartment of FIGS. 2a-b, the fan 7 can additionally be configured to generate an elevated pressure inside the compartment 1 compared to an exterior of the compartment 1. This elevated pressure can generate a stream of air 18 out of the openings of the compartment 1 (as illustrated in FIG. 2b). In one example, the fan 7 can move between about 10 m³ per hour and about 500 m³ per hour of air (e.g., between about 50 m³ and about 150 m³). This can further reduce an amount of condensed water, especially of dropping water, at the target area(s). In compartments without elevated pressure, the stream of air passing over the openings inside the compartment may suck in humid air through the openings. This can result in additional condensed water formation in the area of the openings.

The compartments of FIG. 1a or FIG. 2a can be varied in many ways. For example, the condensed water removal devices described can also be arranged in a compartment without openings. In one example, a compartment can be a closed compartment having a lid or door to access an interior of the compartment. In these examples, the condensed water collectors can be arranged at different target areas susceptible to condensed water formation in the closed compartments. For example, the compartment may comprise one or more target areas in particularly cold regions of the compartment. In still other examples, a compartment can have other openings to an ambient environment than the openings to introduce a tool (e.g., a pipette) in the compartments of FIG. 1a and FIG. 2a.

After several embodiments of the condensed water removal system have been explained in connection with FIG. 1 to FIG. 2b, details of example condensed water collectors will be discussed next in connection with FIG. 3.

Figure 3:
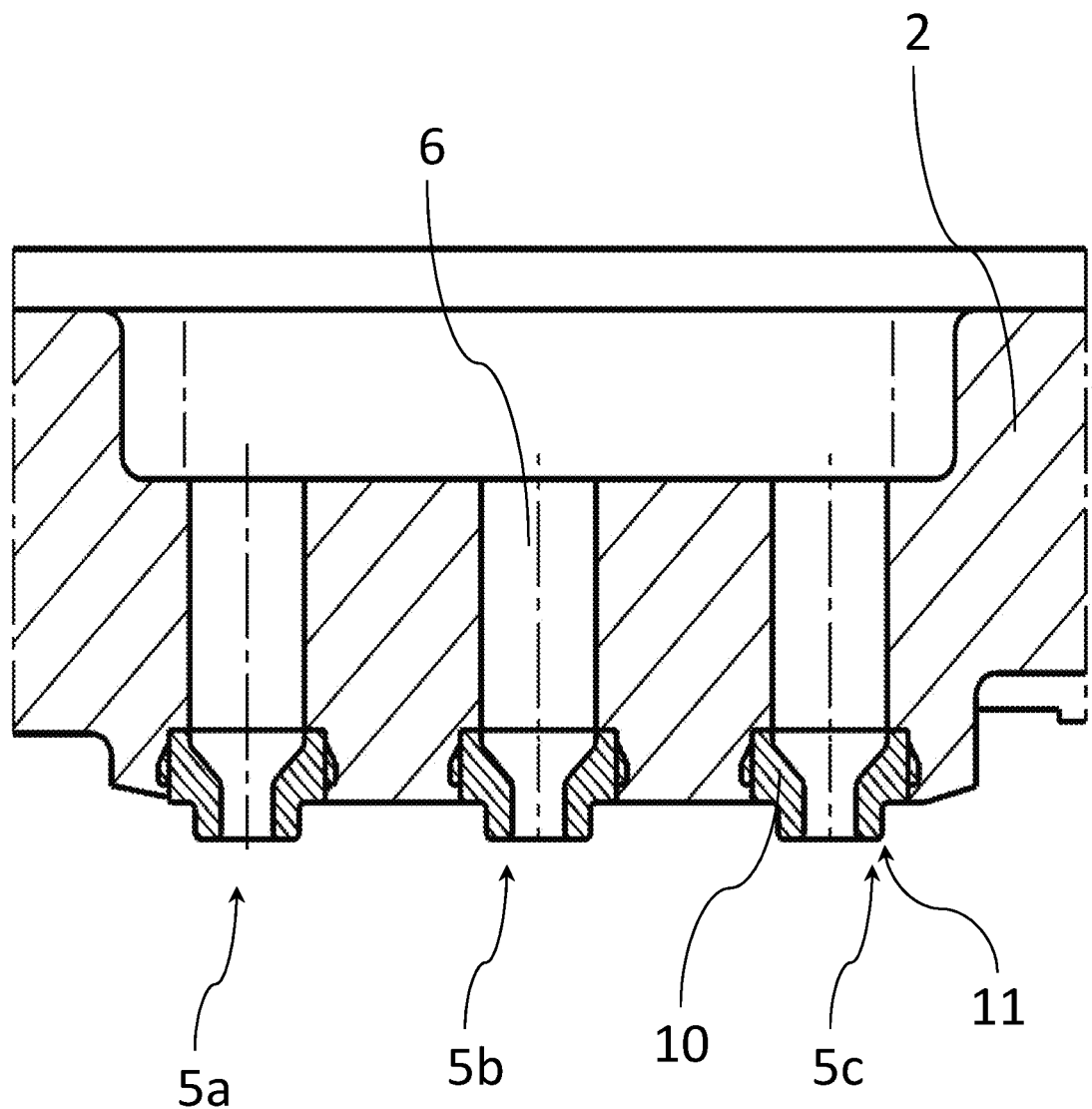
FIG. 3 illustrates a portion of another example compartment including three condensed water collectors according to an embodiment of the present disclosure.

The condensed water collectors 5a, 5b, 5c in FIG. 3 can be arranged in an inside wall of a thermal insulation 2 of the compartment at the inward end of an opening for introducing a tool into the compartment. The condensed water collectors 5a, 5b, 5c can provide an internal passage for the tool to be inserted into the interior of the compartment. In the example of FIG. 3 the internal passage can have a conical entrance adapted to receive a pipetting tool.

As discussed above, the condensed water collectors 5a, 5b, 5c can comprise a porous material configured to collect condensed water (in a first region) and set free condensed water (in a second region).

The pore geometry and size of the porous material can be selected in any suitable way to achieve this goal. The term "porous" may not be limited to spongiform materials. Rather, a porous material can also include pores extending in only one dimension or only two dimensions. Moreover, a porous material can be ordered or non-ordered. For example, a porous material can include a bunch of tubes extending through the material. In other examples, a porous material can include a plurality of channels extending through the material. In still other example, a porous material can include a regular array of connected voids forming passages extending through the porous material.

The porous material can have an average pore size of between about 1 µm and about 100 µm (e.g., between about 20 µm and about 40 µm). The term 'pore size' can be defined as a diameter of a circle inscribing a cross-section of a pore of the porous material in a direction orthogonal to an intended flow direction of the condensed water. For example, in FIG. 1b and FIG. 2b, an intended flow direction of the condensed water can generally be in a downward direction (i.e., in an inward direction) from a target area where the condensed water can be collected. In another example, in the area of the condensed water collector of FIG. 4 extending through the wall of the compartment an intended flow of condensed water can point in an outward direction.

In some examples, a finer pore size can improve the condensed water collectors' 5a, 5b, 5c capability to transport condensed water over longer distances at the expense of an amount of condensed water that can be stored in the porous material.

In order to collect condensed water from the target areas and in order to release collected condensed water to a stream of air circulating in the compartment the porous material can include one or more open-pored surfaces. In other words, a network of pores, channels, passages or tubes inside the porous material can be accessible at one or more surfaces of the condensed water collector. For instance, in the example of FIG. 3 the condensed water collectors 5a, 5b, 5c can include open-pored surfaces at surfaces of inner passages formed inside the condensed water collectors 5a, 5b, 5c and surfaces adjacent to the interior of the compartment.

In one example, the porous material of the condensed water collectors 5a, 5b, 5c can be hydrophilic. The term 'hydrophilic material' as used can include materials that have hydrophilic properties as fabricated as well as materials that are treated to exhibit hydrophilic properties. In addition, the term "hydrophilic material" can be used to describe a hydrophilic property of the material in its porous form as used in the condensed water collectors. Some materials may not exhibit hydrophilic in other configurations (e.g., in the form of a flat surface) but nevertheless can be hydrophilic when brought into particular porous configurations. In other words, the hydrophilicity of the porous materials can in some examples be generated by the geometry of the porous material.

In some examples, the porous material can be permanently hydrophilic. 'Permanently hydrophilic' can refer to a period of more than a week (optionally, more than one month) while the compartment including the porous material can be operated in an intended mode of operation. In one example, the porous material can comprise a hydrophilic coating extending partially over or completely over a network of pores formed by a substrate material.

The porous material can comprise a ceramic material, a glass material or a plastic material, or a combination of two or more of these materials. Even though the preceding discussion of porous materials has involved the particular condensed water collectors shown in FIG. 3, the different aspects of the porous materials may not be limited to this particular form of condensed water collectors. Rather, porous materials as discussed above can also be used in the other condensed water collectors discussed.

The condensed water collectors 5a, 5b, 5c of FIG. 3 (or any other condensed water collector of the present disclosure) can be fabricated by injection molding, milling or sintering, or by a combination of these techniques.

In the preceding passages properties that the porous material of the condensed water collector may exhibit have been discussed in connection with the example condensed water collector of FIG. 3. Subsequently, several alternative geometries of condensed water collectors and condensed water removers will be discussed in connection with FIG. 4 to FIG. 6.

In FIG. 4, the condensed water collector 5 can have an elongated shape and can extend through a wall of the compartment 1. The condensed water collector 5 can be configured to collect condensed water at multiple target areas at openings of the compartment 1. However, in other examples, the target areas can also comprise other areas inside a compartment susceptible to condensed water formation (e.g., in a compartment without openings).

Moreover, the condensed water collector 5 can be configured to transport the collected condensed water towards a second region 11 which can be arranged outside of the compartment 1. Optionally, the condensed water collector 5 can be arranged so that between the target areas and the second region 11 outside the compartment 1 condensed water cannot be set free from the condensed water collector 5. For example, the porous material of the condensed water collector 5 can be closed-pored at surfaces between the target areas and the second region outside the compartment 1. In addition, or alternatively, the porous material of the condensed water collector 5 can be coated at surfaces between the target areas and the second region outside the compartment 1.

Furthermore, the compartment 1 of FIG. 4 can comprise a different arrangement of a condensed water remover compared to the compartments of FIG. 1a and FIG. 2a. The condensed water remover of FIG. 4 can be arranged outside of the compartment 1. For example, the condensed water remover can include a fan 7 (or another air or gas moving device) and a heat exchanger 4 arranged at least partially outside of the compartment. In addition, the condensed water remover can cooperate with a Peltier element 16 arranged in a wall of the compartment 1. In the example of FIG. 4, the fan 7 can move air through the heat exchanger 4 which can be in contact with a warm surface 19 of a Peltier element 16. The warm surface 19 of the Peltier element 16 can heat the air which can be subsequently moved in the direction of the second region 11 of the condensed water collector 5 arranged outside of the compartment 1. There, the stream of heated air 12 can vaporize the condensed water stored in the second region 11 and transport the vaporized condensed water away from the condensed water collector 5. The condensed water collector 5 can comprise optional holes, or other openings, at the second region 11. This can increase a surface of the condensed water collector 5 exposed to the stream of air 12 and, in turn, an amount of condensed water vaporized from the second region 11.

As stored condensed water is removed from the condensed water collector 5 by the stream of air 12 generated by the fan 7, the condensed water collector can again be put into condition to collect condensed water at the target areas 10 inside the compartment 1. The condensed water collector 5 can under some operational conditions generate a continuous stream of condensed water from the interior of the compartment 1 to the outside space. In some examples, a formation of condensed water drops at the openings of the compartment 1 can be avoided.

In this manner, the condensed water remover can be formed without adding a substantial number of new components, by using components of the cooling device of the compartment. This can also be the case in the examples of FIG. 1a and FIG. 2a where the fan and heat exchanger can be arranged inside the compartment. The double use of some components for cooling and condensed water management can reduce a complexity of a compartment compared to examples where both functions are separate.

However, in other examples, the parts of the condensed water management remover can be dedicated components of the condensed water remover (and the compartment can comprise an additional cooling device). In one example, a stream of air removing collected condensed water from the condensed water collector 5 can be generated by a dedicated fan or other air mover of a condensed water remover. In still other examples, the stream of air can be generated by a fan or air mover of a different component than the cooling system of the compartment (e.g., a fan of a cooling system of a processing unit of an analysis system).

The compartment 1 of FIG. 4 may not have an internal fan or other air mover to circulate air inside the compartment (as shown, e.g., in the compartments of FIG. 1a and FIG. 2a). Rather, the compartment 1 can comprise a thermally conductive element 17 (e.g., a metal element) coupled to the Peltier element 16 and extending inside the compartment 1. The cool(er) surface of the Peltier element 16 can cool the thermally conductive element 17 and thereby the interior of the compartment 1.

In other examples, the arrangements of the compartments of FIG. 1a or FIG. 2a and FIG. 4 can be combined. For instance, a condensed water remover can comprise an outside condensed water remover arranged outside of the compartment and an inside condensed water remover arranged inside the compartment. Accordingly, a condensed water collector can be configured to transport collected condensed water to second regions outside of the compartment and inside of the compartment. In one example, the condensed water remover can comprise one fan arranged outside of the compartment configured to generate a stream of air over a second region of the condensed water collector outside of the compartment and a second fan configured to generate a second stream, of air over different second regions inside the compartment.

In the preceding examples condensed water removers including a fan (or other air movers) have been discussed. In addition, or alternatively, the condensed water removers described herein can comprise one or more heaters arranged to heat the second region of the condensed water collectors. For example, the one or more heaters can be arranged adjacent to the second region (e.g., the second region outside of the compartment shown in FIG. 4 or FIG. 5). As the second region of the condensed water collector is heated by the one or more heaters, collected condensed water can evaporate out of the second region.

A further example of a compartment is shown in FIG. 5. The condensed water remover of the compartment 1 can be an external condensed water remover as discussed in connection with FIG. 4. Furthermore, the shape of the condensed water collector 5 can be similar to the shape of the condensed water collector of FIG. 4.

However, the condensed water collector of FIG. 5 may not be attached to an inside wall of the compartment 1. Rather, the condensed water collector 5 can form a part of a wall of the compartment 1 (a part of the lid of the compartment in the example of FIG. 5). Moreover, a thermal insulation 2 of the compartment may not extend over the condensed water collector. In other words, the condensed water collector 5 can form a part of an outside wall of the compartment 1. In this example, the condensed water collector 5 can provide for thermal isolation in the area of the outside wall formed by the condensed water collector 5.

In the example of FIG. 5, the condensed water collector 5 can collect condensed water in a target area adjacent to openings 6 of the compartment 1 and transport the collected condensed water towards the second region 11 outside of the compartment as discussed in connection with the compartment of FIG. 4.

In addition, the condensed water collector 5 of FIG. 5 can also be configured to transport collected condensed water towards an outer surface adjacent to the exterior of the compartment (e.g., an upper surface of the condensed water collector 5 in FIG. 5). At this outer surface collected condensed water can vaporize into the ambient atmosphere.

In other examples, an outside surface of the condensed water collector 5 away from the target area and the second region can be at least partially closed-pored so that collected condensed water cannot evaporate at the outer surfaces. In still other examples, an outside surface of the condensed water collector 5 away from the target area and the second region can be at least partially coated with an impermeable coating so that collected condensed water cannot evaporate.

As can be seen in FIG. 5, the condensed water collector 5 forming a part of the outer wall of the compartment can also comprise a second region outside the compartment as discussed in FIG. 4. In addition, or alternatively, the condensed water collector 5 of FIG. 4 can be combined with a condensed water remover generating a stream of air inside the compartment 1 as shown in FIG. 1a or FIG. 2a.

In still other examples, the condensed water collector can form an integral part of a wall of the compartment in a different manner as shown in FIG. 5. For example, a compartment having one or more openings can comprise one or more condensed water collectors and each condensed water collector can form a portion of the wall of the compartment in an area of the one or more openings. For instance, the condensed water collectors can form an area of the wall of the openings for insertion of a tool shown in FIG. 1a and FIG. 2a.

In still other examples, the compartment may not have an "active" condensed water remover arranged outside of the compartment (e.g., the compartments of FIG. 4 or FIG. 5 can also operate without the outside fans and heat exchangers). In these examples, a warmer and/or drier ambient atmosphere compared to the atmosphere inside the compartment can cause evaporation of collected condensed water from the second region of the condensed water collector outside of the compartment.

In one example, a compartment can comprise at least one condensed water collector. The condensed water collector can have a first portion inside the compartment and a second portion extending through a wall of the compartment outside of the compartment and a porous material configured to collect condensed water that condenses inside the compartment and guide it towards the outside of the compartment.

This example of a compartment without an "active" condensed water remover can be combined with all features described herein for compartments having an "active" condensed water remover.

Figure 6:
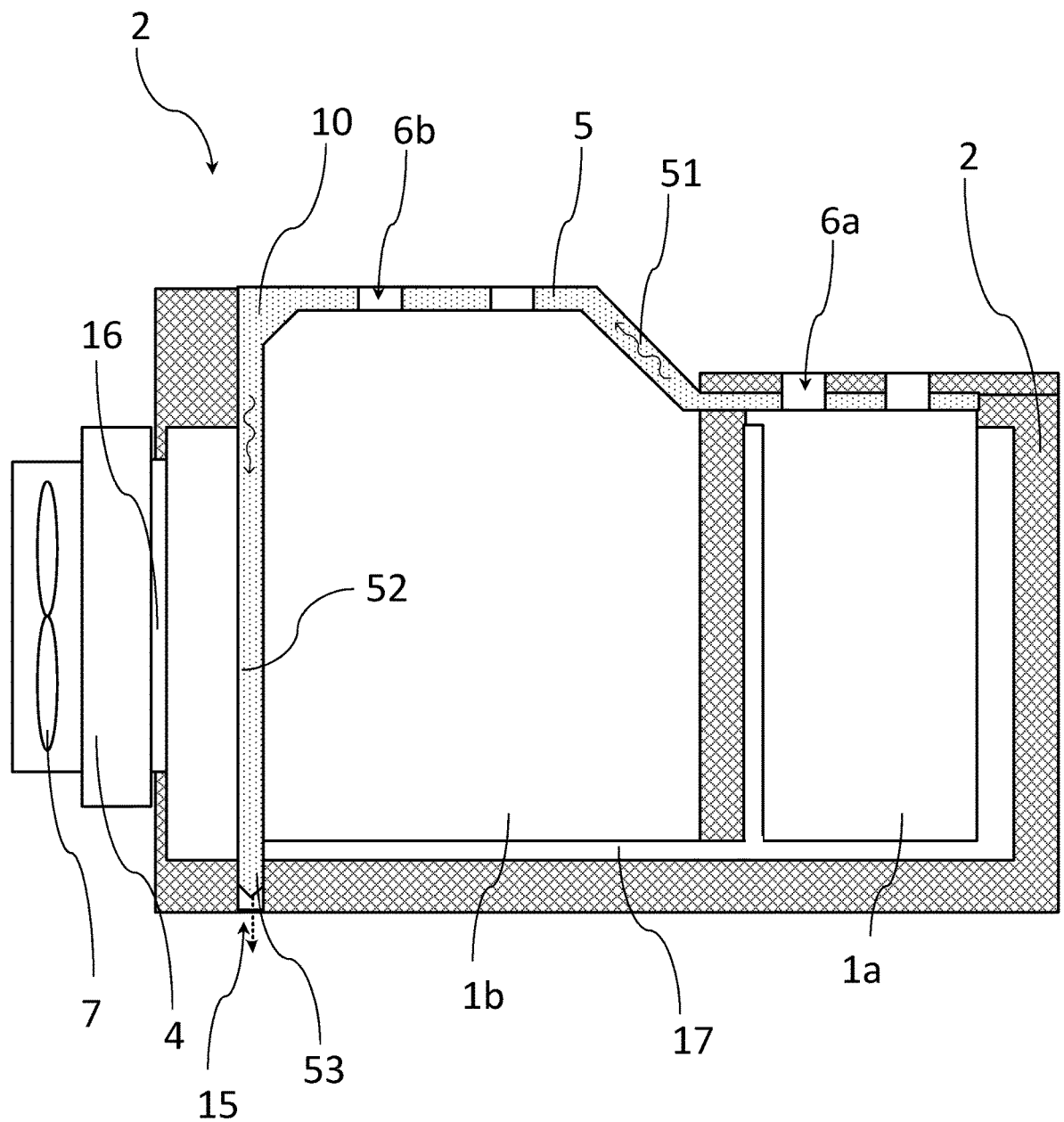
FIG. 6 illustrates a fifth example compartment including a condensed water remover and a condensed water collector according to an embodiment of the present disclosure.

FIG. 6 shows a further example of a condensed water collector of the present disclosure. The compartment of FIG. 6 can comprise further additional aspects of the condensed water management system of the present disclosure.

On the one hand, the compartment 1 of FIG. 6 can comprise two sub-compartments 1a, 1b. In addition, the condensed water collector 5 of FIG. 6 can be a condensed water collector including multiple portions. Last, the compartment 1 of the example of FIG. 6 can comprise a condensed water remover in the form of condensing zone 53 to condense water stored in the condensed water collector 5. Even though these different features are shown in the compartment of FIG. 6 in combination, a compartment can also comprise only one or only two of these features. In addition, or alternatively, the compartments of FIG. 1a to FIG. 5 can also have one or more of the features of the compartment of FIG. 6. For instance, the compartments of FIG. 4 or FIG. 5 can comprise two or more sub-compartments and/or a multipartite condensed water collector as shown in FIG. 6.

In the example of FIG. 6, the two sub-compartments 1a, 1b can each have one or more openings 6a, 6b arranged to access the interior of the respective sub-compartment 1a, 1b. The condensed water collector 5 can extend continuously past the openings 6a, 6b of the first and second sub-compartments to collect condensed water at each of the openings 6a, 6b. In other examples, the sub-compartments 6a, 6b can each comprise one or more dedicated condensed water collectors. In addition, or alternatively, the compartment can comprise more than two sub-compartments and a single condensed water collector arranged to collect condensed water from a target area in each of the more than two sub-compartments.

Moreover, the condensed water collector 5 of FIG. 6 can form a part of the wall of the second sub-compartment 1b while it can be covered by a thermal insulation 2 in the area of the first sub-compartment 1a. For instance, the first sub-compartment 1a can be cooled to a colder temperature than the second sub-compartment and hence can require a better thermal isolation. In other examples, the condensed water collector can form a part of the wall of both (or more than two) sub-compartments. In still other examples, the condensed water collector can be covered by a thermal insulation of the respective compartment in both (or more than two) sub-compartments.

Moreover, the condensed water collector of the compartment of FIG. 6 can comprise multiple portions. For instance, a first portion 51 of the condensed water collector can be configured to move the collected condensed water at least partially in an uphill direction. This uphill transport can be affected by capillary forces in the porous material of the condensed water collector 5. The condensed water collectors shown in connection with FIG. 4 and FIG. 5 can also have portions adapted to transport collected condensed water in an uphill direction in some examples. For instance, a condensed water collector can adapt to a shape of the interior of a compartment (e.g., a shape of the upper part of the compartment's interior).

In addition, the condensed water collector 5 of FIG. 6 can comprise a second portion 52 in which the collected condensed water can be transported in a downhill direction. This downhill transport of the condensed water can be affected by gravitational forces, by capillary forces or a combination of both. Again, a portion in which the collected water can be transported in a downhill direction can also be employed in the compartments of FIG. 1a to FIG. 5 (e.g., to transport the collected condensed water to a second portion in a particular position where the condensed water remover of the compartment can remove collected condensed water from the water collector).

Lastly, the condensed water collector 5 of FIG. 6 can be coupled to a condensed water remover 53 in the form of a condensing zone for the collected condensed water. In the example of FIG. 6, the condensing zone can form a pointed surface at which condensed water droplets can form.

As can be seen in FIG. 6, the condensing zone can be formed inside a drainage 15 in the wall of the compartment 1. The condensed water can drip from the condensing zone and can be collected outside of the compartment 1. In this manner, the condense water can be removed from the compartment 1 to an outside environment. In other examples, the condensed water remover 53 in the form of a condensing zone can be formed outside of the compartment.

In other examples, condensed water can be collected in a container arranged inside the compartment. The container can be configured to be removable from the compartment to dispose the collected condensed water. In other examples, the container can be connected to a pumping circuit to remove the condensed water. A container to collect condensed water can also be used in the other compartments described (e.g., the compartments of FIG. 1a or FIG. 2a).

As can be seen in FIG. 6, the condensed water remover 53 can be spaced apart from the target region where condensed water can be collected. In this manner, it can be prevented that condensed water drops form in critical areas inside the compartment.

As the compartment of FIG. 4 and the compartment of FIG. 5, for instance, a Peltier element 16 can cool a thermally conductive element 17 (e.g., a metal element) which, in turn, can cool the interior of the sub-compartments 1a, 1b. A warm surface 19 of the Peltier element 16 can optionally by equipped with heat exchanger 4 and a fan 7 to remove heat from the warm surface 19 of the Peltier element 16.

In other examples the condensed water collector of FIG. 6 can be combined with the active cooling of the compartment's interior discussed in connection with FIG. 1a or FIG. 2a. For example, the condensed water collector can transport condensed water directly to the drainage 15 or re-collect condensed water vaporized by a stream of air circulating inside the compartment 1.

In still other examples, the condensed water collectors described herein can combine one or more condensed water remover in form of a condensation zone (e.g., as in the compartment of FIG. 6) with one or more second regions outside the compartment (e.g., as in the compartments of FIG. 4 or FIG. 5). In general, the compartments described herein can employ different types of condensed water removers or more than one of a predetermined type of condensed water remover in parallel.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A compartment, the compartment comprising:
    at least one opening, wherein the at least one opening is a target area susceptible to condensed water formation;
    at least one condensed water collector, wherein the condensed water collector comprises at least a first portion arranged on the at least one opening to collect condensed water from the at least one target area and at least a second portion outside of the at least one target area, wherein the first portion is located inside the compartment, wherein the condensed water collector extends through a wall of the compartment to place the second portion of the condensed water collector outside of the compartment, and wherein the condensed water collector comprises a porous material arranged between the first portion and the second portion and configured to collect condensed water in the first portion and configured to transport the collected condensed water from the first portion to the second portion and to set free condensed water from the second portion;
    a condensed water remover configured to remove condensed water from the second portion thereby facilitating transportation of condensed water from the first portion to the second portion via the porous material, wherein the condensed water remover comprises a fan configured to generate a stream of gas over the second portion for facilitating evaporation of condensed water collected by the porous material from the at least one condensed water collector and a condenser arranged inside the compartment configured to remove vaporized condensed water from a stream of gas circulating in the compartment;
    wherein the condensed water remover comprises a warm surface of a Peltier element configured to heat the second portion for facilitating evaporation of condensed water collected by the porous material from the condensed water collector; wherein the condensed water collector is arranged in an inside wall of thermal insulation of the compartment to provide an internal passage for a tool into the compartment; and
    wherein the internal passage is conical shaped.

2. The compartment according to claim 1, wherein the compartment is one or more of a sample storage compartment, a reagent storage compartment, a reagent manipulator compartment, a sample manipulator compartment and/or a quality control compartment.

3. The compartment according to claim 1, wherein the at least one opening is configured to insert a tool into the compartment.

4. The compartment according to claim 1, wherein the condenser comprises a heat exchanger arranged adjacent to a cool surface of the Peltier element.

5. The compartment according to claim 1, further comprising, a funnel configured to suck in air from outside the compartment.

6. The compartment according to claim 1, wherein the fan is configured to move between 10 m³ per hour and 500 m³ per hour of air.

7. The compartment according to claim 1, wherein the condensed water collector has an elongated shape and extends through a wall of the compartment.

8. The compartment according to claim 1, wherein the tool is a pipette or a needle.

9. The compartment according to claim 1, wherein the condensed water remover is arranged outside the compartment.

10. The compartment according to claim 1, wherein the condensed water collector forms part of an outside wall of the compartment.

* * * * *